(12) United States Patent
Scott et al.

(10) Patent No.: US 9,660,900 B2
(45) Date of Patent: *May 23, 2017

(54) ARCHITECTED DATA TRANSFER

(71) Applicant: Oracle International Corporation, Redwood Shores, CA (US)

(72) Inventors: Glenn Carter Scott, Los Altos, CA (US); Reema Koo, Broomfield, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,074

(22) Filed: Mar. 2, 2016

(65) Prior Publication Data

US 2016/0182364 A1   Jun. 23, 2016

Related U.S. Application Data

(63) Continuation of application No. 13/773,526, filed on Feb. 21, 2013, now Pat. No. 9,282,128.

(51) Int. Cl.
| | |
|---|---|
| G06F 15/16 | (2006.01) |
| H04L 12/707 | (2013.01) |
| H04L 29/06 | (2006.01) |
| H04W 4/18 | (2009.01) |
| H04L 29/08 | (2006.01) |

(52) U.S. Cl.
CPC .......... *H04L 45/24* (2013.01); *H04L 65/4007* (2013.01); *H04L 67/06* (2013.01); *H04L 67/10* (2013.01); *H04L 67/108* (2013.01); *H04L 67/1008* (2013.01); *H04L 67/1063* (2013.01); *H04W 4/18* (2013.01); *H04L 67/02* (2013.01); *H04L 67/104* (2013.01); *H04L 67/1085* (2013.01)

(58) Field of Classification Search
CPC ............................... H04L 67/104; H04W 4/18
USPC ...................... 707/E17.032, 999.01; 709/219
See application file for complete search history.

(56) References Cited

U.S. PATENT DOCUMENTS

2008/0133535 A1* 6/2008 Fischer ................. H04L 67/104
2011/0276657 A1* 11/2011 LeBlanc ................. H04W 4/18
                                                        709/219

* cited by examiner

*Primary Examiner* — Kyung H Shin
(74) *Attorney, Agent, or Firm* — Hickman Palermo Becker Bingham LLP

(57) ABSTRACT

Techniques for architected data transfer are described. A controller maintains a network information database representing overarching knowledge of the network, such as the underlying communication infrastructure, resource consumption limits, and segment locations. The controller uses the information stored in the network information database to direct transmitters to transfer data segments to receivers in a manner that ensures relatively predictable resource consumption. In one approach, the controller receives a request to transfer data to a receiver. The controller, based on the information contained in the network information database, computes an optimal set of transmitters to participate in the transfer. The controller sends each transmitter in the optimal set an instruction assigning that transmitter to transfer one or more segments of the data to the receiver. Each transmitter, upon receiving the instructions, sends their respectively assigned data segments to the receiver.

18 Claims, 5 Drawing Sheets

ARCHITECTED DATA TRANSFER

CROSS-REFERENCE TO RELATED APPLICATIONS; BENEFIT CLAIM

This application claims the benefit as a Continuation of application Ser. No. 13/773,526, filed Feb. 21, 2013, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

The techniques presented herein are directed towards data transfer.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data Transfer

Data transfer, the act of copying a set of data blocks (sequences of bits and bytes) from location A to location B, is a fundamental operation in the information technology world. As more and more data needs to be moved from location to location, finding efficient ways to distribute the data becomes an increasingly important goal, impacting many areas including resource planning, billing, cost-management, and reliability.

In perhaps one of the most straightforward examples of data transfer, a single transmitter is tasked with sending data (e.g. a file) to a single receiver. In one approach, the transmitter sends the data in order to the receiver until all the data has been transferred. In the event that the connection between the transmitter and the receiver is interrupted, the transmitter simply restarts the data transfer from the beginning. This approach is particularly easy to implement since the transmitter and receiver only need to store minimal state information regarding the transfer. However, when the connection is prone to frequent interruptions, the restarts may cause the same portions of the data to be transferred many times, resulting in inefficient use of the underlying network. Furthermore, this approach is unable to take advantage of parallelism to speed up the transfer.

In another approach, the transmitter divides the data into a number of segments representing pieces of the data to be transferred. During data transfer, the transmitter sends the segments (in potentially any order) to the receiver, where the segments are reassembled back into the original data. In the event that the connection between the transmitter and the receiver is interrupted, the transmitter only needs to send the missing segments upon reestablishing the connection. In addition, since the segments may be transferred in any order, the transmission of individual segments may be performed in parallel, reducing the total transfer time by taking advantage of multitasking.

However, in many cases data transfer involves more than communication between a single transmitter and a single receiver. Some data represents content (e.g. software, patches, multimedia, etc.) that needs to be transferred to a potentially very large number (e.g. hundreds, thousands, millions, etc.) of client machines. In one approach, a limited number of servers transfer data to a multitude of clients by initiating individual data transfers using techniques such as the ones described above. In one model, known as the "push" model, the servers initiate contact with the clients to upload the data. In another model, known as the "pull" model, the clients initiate contact with the servers to download the data. In either case, the number of clients which require the data will often far outpace the capability and resources of the servers to keep up with the demand. As a result, the clients may encounter slow transfer speeds and/or dropped connections as the servers attempt to distribute their resources among too many clients.

Another approach, known as a Peer-to-Peer approach, is utilized by file sharing protocols such as BitTorrent. In this approach, the data is segmented and stored across an initial set of transmitters (also referred to as "seeds"). A central authority (also referred to as a "tracker") maintains a manifest that indicates where the segments of data are stored. Data transfer involves a receiver contacting the central authority, receiving the manifest, and retrieving segments of the data from among the available transmitters. In many cases, the receivers request different segments from different transmitters in order to take advantage of parallel transfers.

However, as each receiver obtains a new segment of the data, that receiver also becomes a transmitter of the segment, adding to the total resources available to transfer that segment to receivers still requiring a copy. Thus, instead of being limited to the resources of an initial set of transmitters, the resources available to transfer the data quickly scales upwards as more and more segments propagate throughout the network. In addition, since the segments are stored many times across the network, the availability and fault tolerance of the network also improves.

BRIEF DESCRIPTION OF THE DRAWINGS

The present invention is illustrated by way of example, and not by way of limitation, in the figures of the accompanied drawings and in which like reference numerals refer to similar elements and in which.

DETAILED DESCRIPTION

Figure 1:
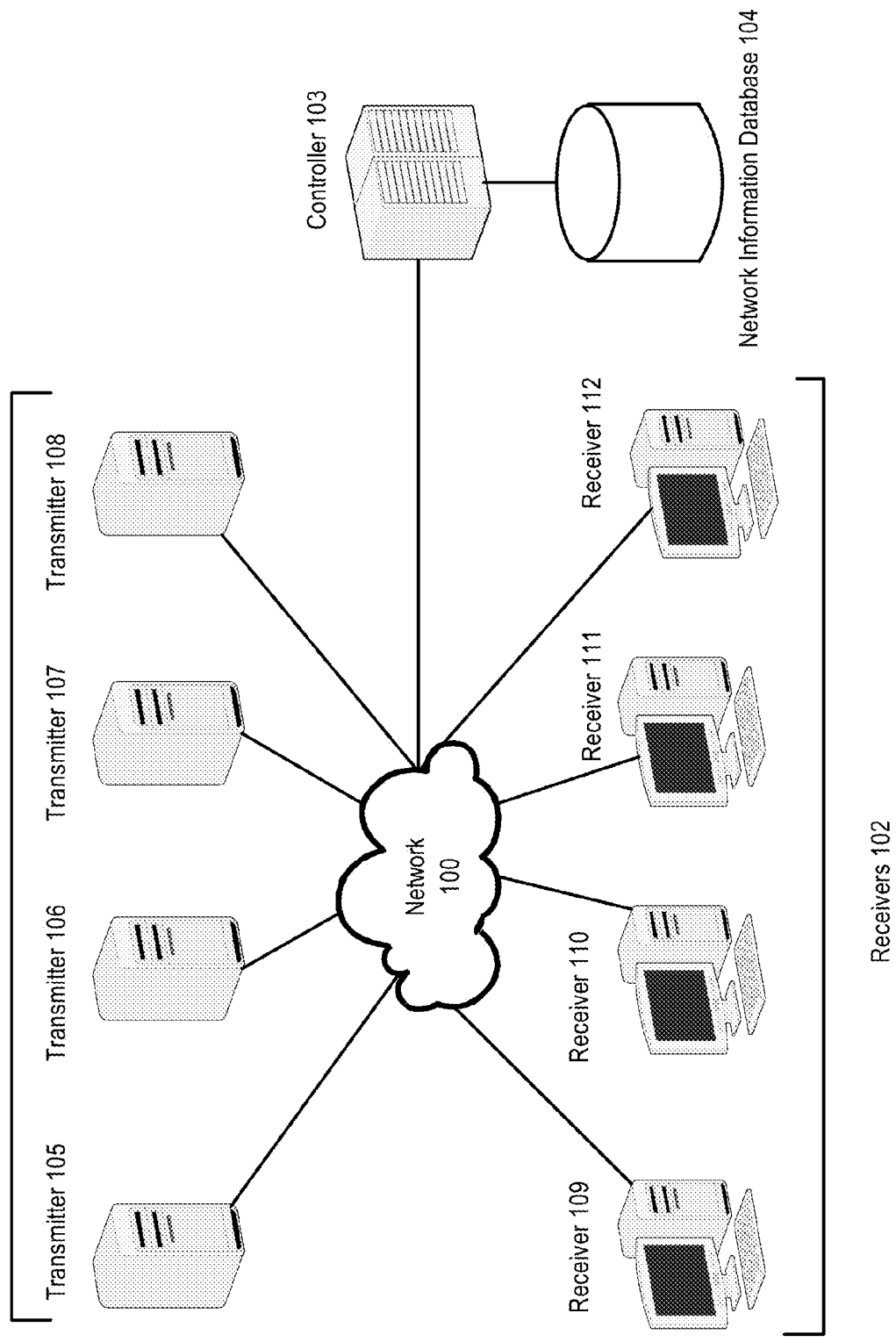
FIG. 1 is a block diagram illustrating an example operating environment upon which an embodiment of the present invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Operating Environment
3.0 Initial Seeding and Data Segmentation
4.0 The Network Information Database
5.0 Architected Data Transfer
6.0 Architected Data Transfer to a Particular Receiver
7.0 Architected Data Transfer in a Peer-to-Peer Environment
8.0 Dynamic Peer-to-Peer Approach
9.0 Managing Controller Failure
10.0 Hardware Overview
11.0 Extensions and Alternatives

1.0 GENERAL OVERVIEW

As mentioned above, peer-to-peer data transfer protocols, such as BitTorrent, are particularly well suited for transferring data to a large number of receivers due to the availability and parallelism that can be achieved. However, current techniques fail to provide predicable resource consumption. As an example, the receivers in peer-to-peer data transfer protocols, such as BitTorrent, act as autonomous agents that make independent decisions as to which transmitter to contact in order to receive a particular segment. As a result, the unorganized decision making of the receivers can lead to haphazard and unbalanced loads being placed on the available transmitters. For example, some transmitters may end up being overutilized while other transmitters are underutilized.

In an embodiment a controller maintains a network information database representing overarching knowledge of the network, such as the underlying communication infrastructure, resource consumption limits, and segment locations. The controller uses the information stored in the network information database to direct transmitters (nodes hosting segments of data) to transfer data segments to receivers (nodes requiring a copy of the data) in a manner that ensures relatively predictable resource consumption.

In one embodiment, the controller receives a request to transfer data to a receiver. The controller, based on the information contained in the network information database, computes an optimal set of transmitters to participate in the transfer. The controller sends each transmitter in the optimal set an instruction assigning that transmitter to transfer one or more segments of the data to the receiver. Each transmitter, upon receiving the instructions, sends their respectively assigned data segments to the receiver.

In the event that a transmitter fails while transferring data segments to the receiver, the receiver informs the controller of the failure. The controller in response computes a new optimal set of transmitters and sends out updated instructions that take into account those transfers already underway. In the event that a receiver fails, the transmitter continues to retry until successful, or until certain conditions are met which indicate that the data transfer to the receiver should fail.

In an alternative embodiment, the controller computes a first set of optimal transmitters for the receiver, a second set of next-best optimal transmitters, and so forth. The controller sends this information to the receiver, which in response establishes control over the transfer, using the successive sets of transmitters to locate available segments.

In another embodiment, the controller receives a request to transfer data to a plurality of receivers. In response to receiving the request, the controller computes an optimal set of transmitters to transfer the data and an optimal set of receivers to receive the data. During a first round of data transfers, the optimal set of transmitters send the data to the optimal set of receivers. Upon completion of the first round of data transfers, the controller converts the optimal set of receivers into additional transmitters and re-computes the optimal sets that will be used in the next round. The rounds of data transfer repeat until all of the plurality of receivers have a copy of the data. At each round, the total number of transmitters increases non-linearly. For example, there could be a single transmitter to start, copying a file to two receivers. Once that is complete, the total number of transmitters becomes three. After another round, assuming each of the transmitters copies to two more receivers, the total number of transmitters becomes ten, and so forth until all of the receivers have a copy.

2.0 EXAMPLE OPERATING ENVIRONMENT

FIG. 1 is a block diagram illustrating an example operating environment upon which an embodiment of the present invention may be implemented. In FIG. 1 transmitters 101 (including transmitter 105, 106, 107, 108), receivers 102 (including receiver 109, 110, 111, 112), and controller 103 are communicatively coupled by network 100. The controller 103 is communicatively coupled to network information database 104. For the purposes of illustrating a clear example, FIG. 1 only depicts a particular number of each of the aforementioned elements. However, a practical environment may have many less or many more of each of the elements illustrated by FIG. 1.

In an embodiment, network 100 represents any combination of one or more local networks, wide area networks, internetworks, or service provider networks. In some embodiments, network 100 represents the Internet. The nodes of network 100 may send messages using any number of protocols, such as network layer protocols (e.g. IP, MPLS, IPsec, etc.), transport layer protocols (e.g. TCP, UDP, etc.), and/or application layer protocols (e.g. FTP, SSH, TLS, etc.). However, the exact protocol or combination of protocols used to deliver messages across the network 100 is not critical to the techniques described herein.

In an embodiment, the transmitters 101, receivers 102, and controller 103 represent nodes of network 100. The term "node" as used herein is defined to represent any one of transmitters 101, receivers 102, or controller 103 unless explicitly narrowed to a particular set of actors (e.g. nodes which are transmitters, receiver nodes, etc.). In one embodiment, the nodes represent individual computing devices (e.g. personal computers, embedded devices, network storage appliances, etc.) interconnected by network 100. In some embodiments, each node is identified by a distinct address within the network 100. For example, assuming network 100 uses IP to direct traffic, each node may be identified by a distinct IP address. In some embodiments, the nodes represent computing devices such as those described below in the "Hardware Overview".

In other embodiments, the nodes represent software applications or components of software applications executing on one or more computing devices. As a result, the nodes may be identified within the network 100 by an application or process specific address (e.g. a port address) in addition to a network layer address (e.g. IP address). In some cases, the nodes may represent services running continuously on their respective computing devices, or may be invoked remotely via a communication mechanism such as a RPC, agent, or remote login. It may be the case that a single application may take on multiple roles (and thus represent multiple nodes), such as an application with different subcomponents for fulfilling the role of a receiver, transmitter, and/or controller.

3.0 INITIAL SEEDING AND DATA SEGMENTATION

In an embodiment, the transmitters 101 represent an initial set of nodes that are preloaded with a copy of the data to be transferred to the receivers 102. For example, the transmitters 101 may be preloaded with the data using conventional data transfer protocols (FTP, SSH, TLS, SMTP, etc.) or transferred in hard copy using a storage medium such as a DVD, CD-ROM, floppy disk, flash drive, etc. The exact technique used to load the transmitters 101 with a copy of the data is not critical to the techniques described herein. In some cases, transmitters 101 may represent data storage centers or database management systems which maintain a large number of files (e.g. pictures, multimedia, software, patches, etc.) that that are available for transfer.

Figure 2:
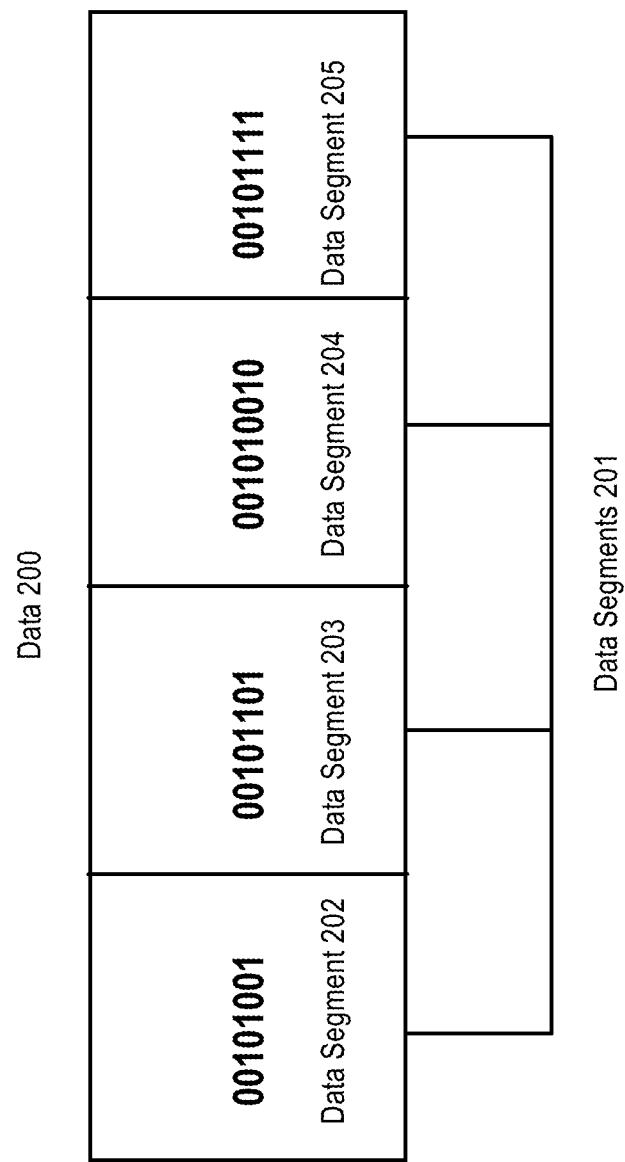
FIG. 2 is a block diagram illustrating example data that has been broken down into multiple data segments.

FIG. 2 is a block diagram illustrating example data 200 that has been broken down into multiple data segments 201 (including data segment 202, 203, 204, 205). Although only a particular number of data segments 201 are depicted in FIG. 2, other embodiments may break the data 200 into any number of segments. For the purpose of illustrating clear examples, it will be assumed that data 200 is the subject of the techniques described hereafter.

In an embodiment, each of the transmitters 101 stores a copy of all the data segments 201. In other embodiments, the transmitters 101 may each store less than the full set of data segments 201. However, in order to illustrate clear examples, it will be assumed that the transmitters 101 store at least one distributed copy of the data segments 201. The number of redundant copies that are stored across the transmitters 101 impact both the availability of parallel transfers and the reliability of the data transfer in case of transmitter failure. For example, if only transmitter 105 stores data segment 202 and goes offline, the transfer of data 200 cannot complete until service to transmitter 105 has been restored. However, when redundant copies of the data segments 201 are stored across the transmitters 101, a different transmitter may take over the transfer in the event of a failure.

In some embodiments, the transmitters 101 store data 200 in an original (unsegmented) form and segments the data 200 as needed once the data transfer process has begun. However, in other embodiments, the transmitters 101 may preemptively segment the data 200 in anticipation of the data transfer. In still other embodiments, the transmitters 101 may be preloaded with an already segmented version of the data 200. In yet another embodiment, the transmitters 101 may contact the controller 103 which segments the data 200 on behalf of the transmitters 101.

The exact technique used to segment the data 200 is not critical. However, as an example, the transmitters 101 or the controller 103 may segment the data 200 by creating a breakpoint every set number of bits/bytes or by dividing the data 200 into data segments 201 of equal length.

In some embodiments data 200 represents a file, one or more data blocks stored on a persistent memory mechanism (e.g. hard drive disks, flash drives, etc.). In some cases, data 200 may adhere to a particular file format as dictated by the type of data that data 200 represents or by the file system upon which the data 200 is stored. For example, if the data 200 represents application data such as a picture or a video the data 200 may be stored as a file adhering to application level formats such as JPEG, MPEG-2, GIF, etc. As another example, if the data 200 is stored as a file on a file system (e.g. FAT32, NTFS, etc.) the data 200 may adhere to the storage formatting and size requirements of the file system. In some embodiments, the data 200 may represent commands (e.g. command line interface commands), executable code, or any other type of data.

In some embodiments, the transmitters 101 store the data segments 201 as separate files along with metadata (e.g. an index number or offset) indicating the order to concatenate the data segments 201 back into the original data 200. However, in other embodiments, the transmitters 101 may store an original copy of the data 200 along with metadata indicating the break points between the data segments 201. For example, the metadata may indicate the byte offset into the data 200 that begins each of the data segments 201. In still another embodiment, the transmitters 101 store the original data 200 without metadata and selects particular segments in response to an instruction from the controller 103 identifying particular segments. For example, the controller 103 may specify one or more byte ranges or offsets into the data 200.

In some embodiments, the transmitters 101 append metadata or send metadata concurrently with the data segments 201 that informs the receivers 102 how to reconstruct the original data 200. For example, each of the data segments 201 may be appended with an index number indicating the segment's relative position within data 200. The receivers 102, upon obtaining the data segments 201 can then append each of the data segments 201 in the order of their index numbers to reconstruct the data 200.

4.0 THE NETWORK INFORMATION DATABASE

The network information database 104 represents one or more storage devices (e.g. hard drive disks, flash drives, RAM, etc.) that contain information related to the nodes of network 100. The controller 103 utilizes the information in the network information database 104 to organize and direct the transfer of data 200 from the transmitters 101 to the receivers 102.

In some embodiments, the controller 103 is physically connected to the network information database 104, such as by a computer bus or Ethernet cable. However, in other embodiments, the controller 103 may access the network information database 104 through one or more intermediary networks. In the embodiment of FIG. 1 the link between the controller 103 and the network information database 104 appears separately from network 100. However, in an alternative embodiment, the controller 103 may access the network information database 104 through network 100.

In some embodiments, the network information database 104 indicates the location of the data segments 201 across the transmitters 101. For example, the network information database 104 may contain a map linking each of the data segments 201 to the transmitters 101 that are available to transfer that segment. As another example, the map may link each of the transmitters 101 to the data segments 201 that are available on that transmitter. In another embodiment, the network information database 104 may indicate which nodes possess the full set of data segments 201. In another embodiment, the network information database 104 may also indicate the location of the data segments 201 across the receivers 102 instead of or in addition to the transmitters 101.

In an embodiment, the network information database 104 identifies nodes by network address (e.g. IP address) and/or application specific address (e.g. port number). However, in other embodiments, each of the nodes may be assigned an identification number that is not necessarily dependent on the node's address. For example, an identification number may be assigned at the time each node joins the network 100 to uniquely identify the node. In another embodiment, the identification number may be a hash of one or more attributes of the nodes, such as the network address, hardware type, name, etc. In some embodiments, the data segments 201 may be identified within the map by an identification number, such as a hash of each segment's content, offset into the data 200, index number, etc.

In some embodiments, the network information database 104 indicates the current utilization of each of the transmitters 101. For example, the network information database 104 may indicate how many receivers 102 are being serviced by each of the transmitters 101. As another example, the network information database 104 may indicate how many/which data segments 201 each of the transmitters 101 are responsible to transfer. As yet another example, the network information database 104 may indicate the resources (e.g. bandwidth) available to each of the transmitters 101. As another example, the network information database 104 may indicate which transmitters 101 are online and/or which transmitters 101 are offline.

In an embodiment, the controller 103 periodically updates the network information database 104. In one embodiment, every set period of time (e.g. second, minute, hour, day, etc.) the controller 103 contacts the other nodes to request update information. In another embodiment, the other nodes are configured to contact the controller 103 every set period of time to deliver the update information. In still other embodiments, the other nodes are configured to contact the controller 103 to provide update information in case of certain events, such as completing transfer of one or more data segments 201, receiving one or more data segments 201, detecting that a particular node has failed, detecting that a particular node has left or joined the network 100, etc.

The update information may include, without limitation, any new data segments 201 that have been acquired by the node since the last update, a full list of the data segments 201 that the node currently possesses, the status of current data transfers, current utilization information, whether particular nodes have gone offline, nodes detected as joining or leaving the network 100, etc.

5.0 ARCHITECTED DATA TRANSFER

Architected data transfer relates to techniques by which a controller 103 with overarching knowledge of the network 100 manages the transfer of data 200 from one or more transmitters 101 to one or more receivers 102. In order to illustrate clear examples, a few approaches will be described in Section 6.0, Section 7.0, and Section 8.0.

Section 6.0 focuses on a simplified (non-peer-to-peer) approach where the controller 103 is tasked with delivering data 200 from the transmitters 101 to a particular receiver 109. The techniques of Section 6.0 are referred to as "non-peer-to-peer" since the receivers 102 are not required to participate beyond simply receiving the data segments 201 and reconstructing the data 200. Thus, the non-peer-to-peer approach may be appropriate for cases where the receivers 102 represent thin clients or clients that are not trusted to assist in subsequent transfers.

In an embodiment of the approach described in Section 6, the controller 103 receives a request to transfer the data 200 to the particular receiver 109. In response, the controller 103 determines an optimal set of transmitters 101 ("optimal transmitters") to perform the transfers and assigns a portion of the data segments 201 to each of the optimal transmitters. The term "optimal" as used herein does not necessarily mean that the selected transmitters 101 are optimal for all situations. Instead, "optimal" is intended to denote that the transmitters 101 have been selected in furtherance of one or more goals. The controller 103 sends instructions to the optimal transmitters specifying the assigned data segments 201. The optimal transmitters, in response, send their respectively assigned data segments 201 to the receiver 109. The receiver 109 in response to obtaining all the data segments 201 reconstructs the data 200.

Section 7.0 builds upon the techniques described in Section 6.0 to illustrate how the controller's 103 organization of the transmitters 101 and receivers 102 may be extended into a peer-to-peer environment. The approach described in Section 7.0 performs discrete rounds where a number of optimal receivers are selected during each round to receive the data segments 201. At the end of each round, the optimal receivers are converted into additional transmitters 101. The optimal receivers then in turn assist with transferring data segments 201 to the remaining receivers 102 during subsequent rounds. As a result, the total resources available to transfer the data 200 is allowed to increase rapidly as the data segments 201 propagate to more and more nodes of network 100.

One consequence of the round based approach is that the next round cannot begin until the optimal receivers of the current round have all obtained a copy of the data segments 201. Thus, the speed of a given round is limited by the slowest transfer performed during that round. Section 8.0 describes an alternative to the round-based approach that performs dynamic conversion of receivers 102 into additional transmitters 101.

In one embodiment of the approach described in Section 8.0, the controller 103 assigns a portion of the receivers 102 to each of the transmitters 101. The transmitters 101 each begin to transfer the data segments 201 to the receivers 102 within their respectively assigned portions. Once a transmitter has completed transferring the data segments 201 to a particular receiver, the transmitter instructs the particular receiver to take over responsibility for a part of the remaining receivers 102 assigned to that transmitter. The transmitter and the particular receiver proceed to deliver data segments 201 to their respectively assigned receivers 102. The process of sending data segments 201 and dividing responsibility for the receivers 102 between the transferor and the transferee continues until all the receivers 102 have a copy of the data segments 201. As a result, the conversion of the receivers 102 into additional transmitters 101 is able to be performed dynamically without waiting for instructions from the controller 103 or the completion of other transfers.

6.0 ARCHITECTED DATA TRANSFER TO A PARTICULAR RECEIVER

Figure 3:
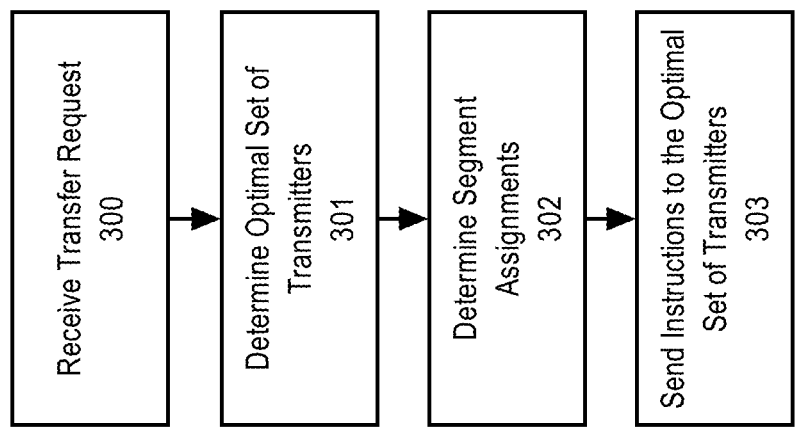
FIG. 3 is a block diagram illustrating a controller managing the transfer of data from a set of transmitters to a particular receiver according to an embodiment.

FIG. 3 is a block diagram illustrating controller 103 managing the transfer of data 200 from transmitters 101 to receiver 109 according to an embodiment. Although receiver 109 has been selected to be the recipient of the data 200 in the following example, the selection is made solely for the purpose of convenience. The technique illustrated by FIG. 3 is applicable to transfer data 200 to any of the receivers 102.

At block 300, the controller 103 receives a request to transfer data 200 to a particular receiver 109. In some embodiments, the controller 103 receives the request from receiver 109. In other embodiments, the controller 103 receives the request from a user, such as through a command line or graphical user interface located at the controller 103. In yet another embodiment, the controller 103 receives the request from another node of the network 100 or an administrator node (not depicted in FIG. 1). For example, a user may remotely log into the controller 103 from another node (e.g. via SSH) in order to submit the request. In other embodiments, the controller 103 may receive a request to transfer data 200 to more than one of the receivers 102. In such embodiments, the steps of blocks 301-303 may be repeated for each of the receivers 102 specified by the request.

In an embodiment, the request specifies the data 200 and a list of one or more receivers 102 that will receive the data 200. For example, assuming that data 200 represents a file, the request may specify the name of the file. The receivers 102 may be identified in the request by network/application level address, such as an IP address/port address pair. However, in other embodiments, the request may specify receivers 102 by identification number.

At block 301, the controller 103 determines an optimal set of the transmitters 101 ("optimal transmitters") that will participate in transferring the data segments 201 to the receiver 109. The optimal transmitters, in various embodiments, may encompass all the transmitters 101, one of the transmitters 101, or any number of transmitters 101 in between. In an embodiment, the controller 103 selects the optimal transmitters based on information stored in the network information database 104. For example, the controller 103 may select the transmitters 101 whose utilization is below a particular threshold or the top N lowest utilized transmitters 101. In other embodiments, the controller 103 may select optimal transmitters based on the transmitters 101 that participated in previous transfers. For example, the controller 103 may take a round robin approach.

At block 302, the controller 103 assigns data segments 201 to the optimal transmitters. In one embodiment, the controller 103 distributes responsibility for the data segments 201 evenly among the optimal transmitters. In another embodiment, the controller 103 distributes the data segments 201 based on information stored in the network information database 104. For example, the controller 103 may assign a larger portion of the data segments 201 to underutilized transmitters 101 or transmitters 101 with greater available resources (e.g. bandwidth).

At block 303, the controller 103 sends each of the optimal transmitters an instruction specifying which data segments 201 to transfer to the receiver 109. For example, the instructions may specify one or more byte ranges, offsets, or index numbers correlating to the data segments 201 that each optimal transmitter is responsible for sending. The transmitters 101 that receive the instruction sent by the controller 103 at block 303 transfer their respectively assigned data segments 201 to the receiver 109.

In the event that one of the optimal transmitters fails, the receiver 109 notifies the controller 103. The controller 103, in response, returns to block 301 and computes a new set of optimal transmitters taking into account the transfers currently underway. For example, one or more of the data segments 201 may have already been transferred to the receiver 109 successfully and do not need to be reassigned. As another example, one or more data segments 201 may currently be in the process of being transferred and, to prevent unnecessary interruptions, the controller 103 maintains the assignment with respect to those data segments 201.

In the event that the receiver 109 fails, each of the optimal transmitters continue to retry until successful or until certain conditions are met that determine the transfer should fail. For example, each of the optimal transmitters may have a threshold number of retries or a window of time within which the transfer either completes successfully or is aborted.

In an alternative embodiment, the controller 103 computes a first set of optimal transmitters, a second set of next-best optimal transmitters, and so forth. The controller 103 sends these optimal sets to the receiver 109, which establishes control over the data transfer. In the event that the receiver 109 is unable to complete the data transfer given the first optimal set (e.g. due to transmitter failure), the receiver 109 uses successive optimal sets to locate the data segments 201.

7.0 ARCHITECTED DATA TRANSFER IN A PEER TO PEER ENVIRONMENT

Figure 4:
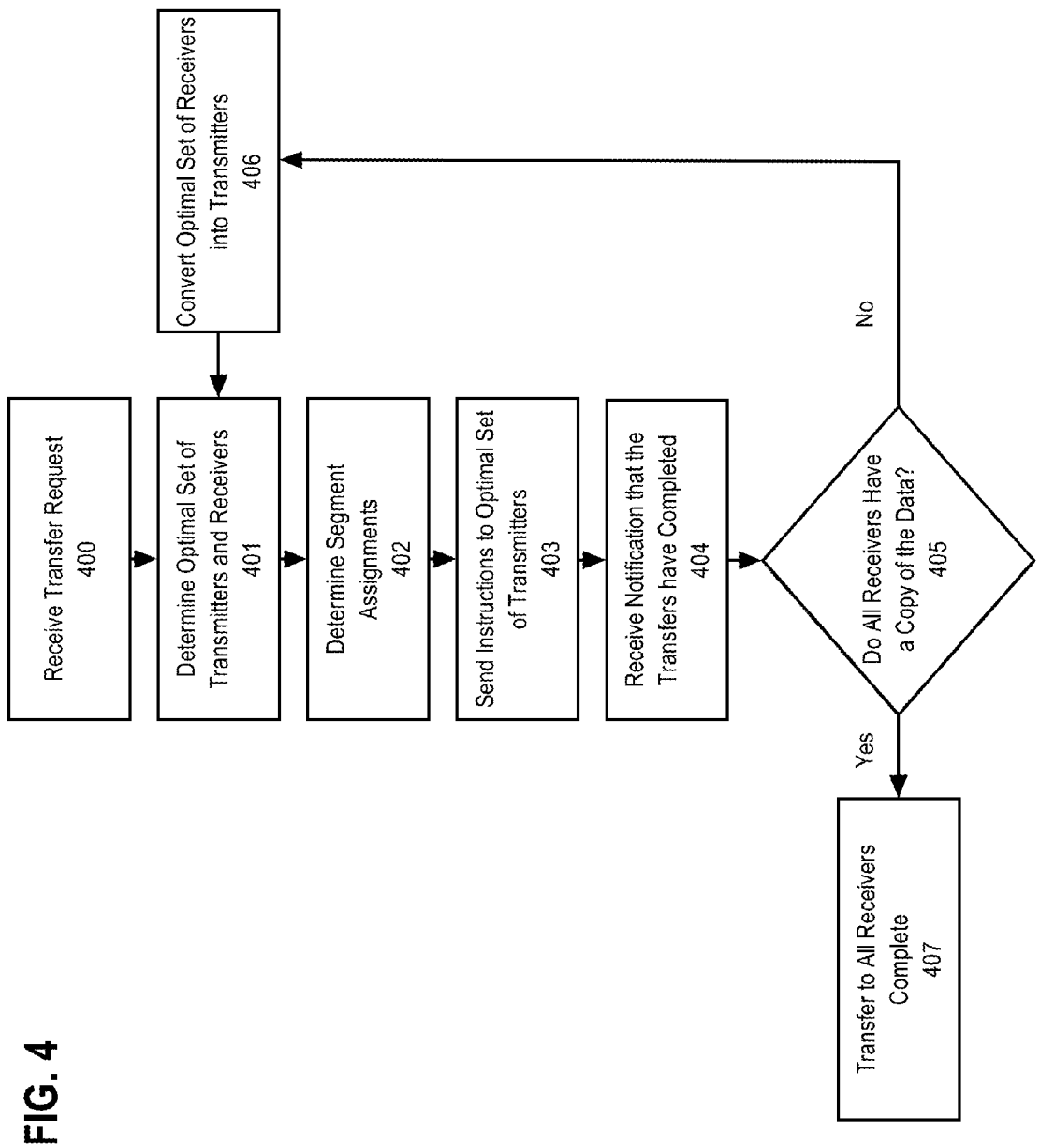
FIG. 4 is a block diagram illustrating a controller directing data transfer between a set of transmitters and a set of receivers in a peer-to-peer environment according to an embodiment.

FIG. 4 is a block diagram illustrating the controller 103 directing data transfer between the transmitters 101 and the receivers 102 in a peer-to-peer environment according to an embodiment.

At block 400, the controller 103 receives a request to transfer data 200 to a plurality of receivers 102. Similar to block 300 of FIG. 3, described above, the controller 103 in various embodiments may receive the request from one or more of the receivers 102, a command line/graphical user interface, another node of the network 100, etc.

At block 401, the controller 103 determines an optimal set of transmitters ("optimal transmitters") and an optimal set of receivers ("optimal receivers").

In an embodiment, the controller 103 determines the optimal receivers by selecting a particular number of the receivers 102 or a percentage of the receivers 102 to receive the data 200 during in the current round. For example, the controller 103 may select the N closest receivers 102 to one or more transmitters 101 within the network 100. As another example, the controller 103 may select a number of receivers 102 with the highest/lowest network addresses or identification numbers. In another embodiment, the number of receivers 102 may be based on the number of transmitters 101 that are currently available. For example, two of the receivers 102 may be selected to join the optimal set for every one of the transmitters 101 that is available.

In an embodiment, the controller 103 determines the optimal transmitters similar to block 302 of FIG. 3 (described above). In some embodiments, the controller 103 divides the optimal transmitters among the optimal receivers. For example, the controller 103 may select receiver 109 and 110 to be optimal receivers and the controller 103 may select all the transmitters 101 to be optimal transmitters. Thus, the controller 103 may assign transmitter 105 and 106 to transfer the data segments 201 to receiver 109 while assigning transmitter 107 and 108 to transfer the data segments 201 to receiver 110. In some embodiments, the transmitters 101 may be assigned to optimal receivers based on a metric such as the distance or latency of the optimal receivers to the optimal transmitters within the network 100.

At block 402 the controller 103 determines segment assignments for the optimal transmitters. In an embodiment, the controller 103 assigns data segments 201 similarly to block 302 of FIG. 3 (described above). For instance, using the example of the preceding paragraph, the controller 103 may split responsibility for the data segments 201 evenly between transmitter 105 and transmitter 106 (assigned to receiver 109) and also between transmitter 107 and transmitter 108 (assigned to receiver 110).

In another embodiment, the controller 103 does not divide the responsibility for the optimal receivers among the optimal transmitters at block 401. Thus, each optimal transmitter is responsible for every optimal receiver, but transfers a different portion of the data segments 201. For example, each of the transmitters 101 may be responsible for transferring one fourth of the data segments 201 to both receiver 109 and receiver 110.

At block 403, the controller 103 sends transfer instructions to the optimal transmitters. In an embodiment, the controller 103 sends the transfer instructions similarly to block 303 of FIG. 3 (described above). The transmitters 101 that receive the instruction sent by the controller 103 at block 403 transfer their respectively assigned optimal receivers.

At block 404, the controller 103 receives notification that the optimal transmitters have completed their respective transfers. In an embodiment, each optimal transmitter, upon completing their assigned transfers, sends a message to the controller 103 specifying that their assigned data segments 201 have been successfully transferred. Thus, the controller 103 receives notification that the transfers have completed once the controller 103 has received such a message from each of the optimal transmitters. However, in another embodiment, each of the optimal receivers, upon receiving all the data segments 201, sends a message to the receiver specifying that all the data segments 201 have been received. Thus, the controller 103 receives notification that the transfers have completed upon receiving such a message from each of the optimal receivers. In yet another embodiment, the optimal receivers and/or optimal transmitters may give piecemeal updates to the controller 103 regarding the state of the transfers. For example, the updates may include the data segments 201 that have been transferred or received by a particular node since the last update. Thus, the controller 103 receives notification that the transfers have completed in response to detecting that the optimal receivers have received all the data segments 201.

At block 405, the controller 103 determines whether all the receivers 102 specified in the request have a copy of the data 200. In an embodiment, the controller 103 (via network information database 104) keeps track of which receivers 102 have received all the data segments 201. Thus, the controller 103 may consult the network information database 104 to perform the determination at block 405.

If at block 405, the controller 103 determines all the receivers 102 specified in the request have a copy of the data 200, then the request has been fulfilled and the controller ends the transfer of data 200 at block 407. Otherwise, the controller 103 proceeds to block 406.

At block 406, the controller 103 converts the optimal receivers into additional transmitters 101. Thus, the optimal receivers are treated by the controller 103 as nodes capable of receiving instructions to transfer data segments 201 to other receivers 102. In some embodiments, the controller 103 performs an overt act, such as marking the optimal receivers as transmitters 101 in the network information database 104 or sending a message to the optimal receivers. For example, the optimal receivers may activate a transmitter module or component in response to receiving such a message from the controller 103. However, in other embodiments, the controller 103 may treat the optimal receivers as one of the transmitters 101 as a consequence of detecting that the optimal receivers now have a copy of the data segments 201. For example, the receivers 102 may be configured to act as transmitters 101 once a copy of the data segments 201 has been obtained.

After the controller 103 converts the optimal receivers into additional transmitters 101, the controller 103 proceeds back to block 401. At block 401, the controller 103 determines a new optimal set of transmitters 101 and receivers 102. The controller 103 repeats rounds of blocks 401-406, until the controller 103 determines that the receivers 102 specified in the request have a copy of the data 200 at block 405.

In an embodiment, contingencies for failure among the transmitters 101 and receivers 102 are handled similarly as described above in Section 6.0.

8.0 DYNAMIC PEER-TO-PEER APPROACH

In an embodiment, the controller 103 divides the receivers 102 among the initial transmitters 101. Each of the transmitters 101 begins to transfer the data segments 201 to their respectively assigned receivers 102. When a transmitter completes the transfer of the data segments 201 to a particular receiver, that transmitter imparts a portion of the remaining assigned receivers 102 to the particular receiver. The transmitter and the particular receiver then proceed to transfer data segments 201 to their respectively assigned receivers 102. The process of completing a transfer and dividing the assigned receivers 102 between the transferor and the transferee continues until all the receivers 102 have a copy of the data segments 201. As a result, the data segments 201 are propagated throughout the network 100 in a rapid non-linear fashion.

For example, assume the controller 103 assigns transmitter 105 to transfer the data segments 201 to a hundred receivers, which will be referred to as receivers 0-99. The transmitter 105 begins by sending the data segments 201 to receiver 0. As a result, receivers 1-99 still require a copy. The transmitter 105 instructs receiver 0 to cover approximately half of the remaining receivers (receivers 1-49) and retains responsibility for the remaining receivers 50-99. Receiver 0 then transfers the data segments 201 to receiver 1, instructing receiver 1 to cover receivers 2-25 and retaining responsibility for receivers 26-49. Meanwhile, transmitter 105 transfers the data segments 201 to receiver 50, instructing receiver 50 to cover receivers 51-74 and retaining responsibility for receivers 75-99. This process continues to repeat in the same fashion until each of the receivers 0-99 obtains a copy of the data segments 201.

In the example above, each node imparts a portion of their assigned receivers 102 to the transferee. However, in other embodiments, the nodes may impart a portion of the assigned data segments 201 instead of a portion the assigned receivers 102. Alternatively, a node may impart to the transferee a portion representing a cross section of the assigned receivers 102 and assigned data segments 201.

In the example above, each node imparts a portion of the assigned receivers 102 after each transfer. However, in another embodiment, the nodes may perform batches of transfers before instructing the transferees to cover a portion of the assigned receivers 102. For example, transmitter 105 may transfer the data segments 201 to receivers 0-3 then instruct each to cover a fifth of the assigned receivers 102.

In some embodiments, the nodes transfer the data segments 201 to receivers 102 in an order that is based on network address. For example, selecting the next receiver based on lowest or highest network address. However, in other embodiments, the nodes may prioritize transfers to receivers 102 that are closer or to which there is lower latency.

9.0 MANAGING CONTROLLER FAILURE

In an embodiment, the controller 103 represents a node that organizes and directs the transfer of data segments 201 from the transmitters 101 to the receivers 102. However, although controller 103 is depicted as a separate entity within FIG. 1, other embodiments may assign the responsibilities of the controller 103 to other nodes of the network 100. For example, the role of the controller 103 may be assigned to the node of the network 100 that has the lowest identification number or network address. In the event that the node performing the duties of the controller 103 fails, the node with the next lowest identification number or network address takes over the role of the controller 103. In some embodiments, only a particular type of node (e.g. the transmitters 101) is allowed to take on the role of the controller 103.

In another embodiment, the controller 103 may not represent any single node of the network 100, but rather is distributed across multiple nodes of the network. For example, the controller 103 may represent the result of a distributed decision making protocol implemented collectively by the transmitters 101 and/or receivers 102.

One reason that an embodiment may choose to implement the controller 103 in a distributed fashion is to prevent Byzantine failures in the network 100 from causing the data transfer to fail. A Byzantine failure is a failure in which components of a system may fail in arbitrary ways (e.g., not just stopping or crashing, but by processing requests incorrectly, corrupting their local state, producing incorrect/inconsistent outputs, etc.).

Correctly functioning components of a Byzantine fault tolerance system can ensure that the system's services are provided correctly assuming that a particular number (threshold amount) of nodes function properly. Embodiments attempting to correct for Byzantine failures can have the nodes taking over the functions of the controller 103 vote on actions to take with the decision being made based on a quorum. In addition, such embodiments may store local state representing the network information database 104 which is updated and maintained based on a quorum of voting nodes. An example of a system for handling Byzantine failures which may be used to implement the controller 103 is described in the paper "Fault-Scalable Byzantine Fault-Tolerant Services" authored by Abd-El-Malek et al., which is hereby incorporated by reference for all purposes as though fully stated herein.

10.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
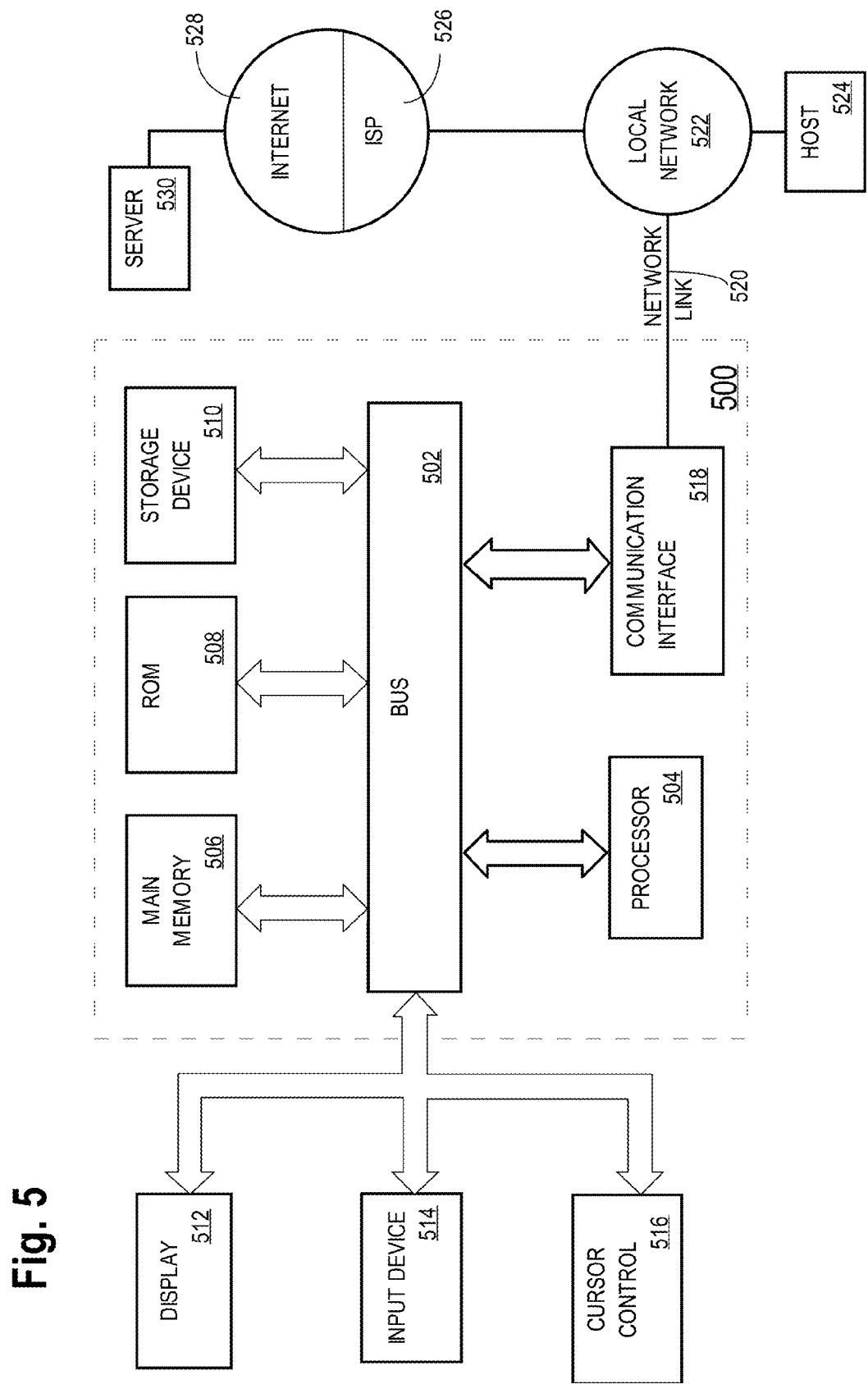
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

11.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a request to transfer data to a receiver;
selecting one or more optimal transmitters from a plurality of transmitters, wherein each transmitter of the plurality of transmitters stores a copy of the data;
assigning a respective one or more segments of the data to each optimal transmitter of the one or more optimal transmitters;
sending an instruction to the receiver, wherein the instruction causes the receiver to retrieve, from each optimal transmitter of the one or more optimal transmitters, the respective one or more segments of the data assigned to the optimal transmitter;
receiving a second request to transfer the data to a second receiver;
selecting second one or more optimal transmitters from the plurality of transmitters;
assigning a second respective one or more segments of the data to each optimal transmitter of the second one or more optimal transmitters;
sending a second instruction to the second receiver, wherein the second instruction causes the second receiver to retrieve, from each optimal transmitter of the second one or more optimal transmitters, the second respective one or more segments of the data assigned to the optimal transmitter, wherein the second receiver is different than the receiver;
wherein the method is performed by one or more computing devices.

2. The method of claim 1, wherein one or more of: the step of selecting or the step of assigning, is performed based on current utilization of the plurality of transmitters.

3. The method of claim 1, wherein one or more of: the step of selecting or the step of assigning, is performed based on resources available to the plurality of transmitters.

4. The method of claim 1, further comprising a particular optimal transmitter of the one or more optimal transmitters detecting that the receiver has failed and in response retrying sending the respective one or more segments of the data to the receiver until successful, until a particular number of retries has been attempted, or until a particular period of time has elapsed.

5. The method of claim 1, wherein each optimal transmitter of the one or more optimal transmitters sends periodic status updates related to a progress of transferring the respective one or more segments of the data of the optimal transmitter to the receiver.

6. The method of claim 1, wherein the receiver reconstructs the data from the respective one or more segments of the data retrieved from each optimal transmitter of the one or more optimal transmitters.

7. The method of claim 1, further comprising, computing a plurality of sets of optimal transmitters, wherein the one or more optimal transmitters is a first set of optimal transmitters of the plurality of sets of optimal transmitters, wherein the instruction sent to the receiver identifies the plurality of sets of optimal transmitters.

8. The method of claim 7, further comprising, in response to detecting that a particular optimal transmitter of the one or more optimal transmitters has failed, retrieving the data from a second set of optimal transmitters of the plurality of sets of optimal transmitters.

9. The method of claim 8, further comprising, in response to detecting that a particular optimal transmitter of the second set of optimal transmitters has failed, retrieving the data from a third set of optimal transmitters of the plurality of sets of optimal transmitters.

10. A non-transitory computer-readable storage medium storing one or more instructions which, when executed by one or more processors, cause the one or more processors to perform steps comprising:
receiving a request to transfer data to a receiver;
selecting one or more optimal transmitters from a plurality of transmitters, wherein each transmitter of the plurality of transmitters stores a copy of the data;
assigning a respective one or more segments of the data to each optimal transmitter of the one or more optimal transmitters;
sending an instruction to the receiver, wherein the instruction causes the receiver to retrieve, from each optimal transmitter of the one or more optimal transmitters, the respective one or more segments of the data assigned to the optimal transmitter;
receiving a second request to transfer the data to a second receiver;
selecting second one or more optimal transmitters from the plurality of transmitters;
assigning a second respective one or more segments of the data to each optimal transmitter of the second one or more optimal transmitters;
sending a second instruction to the second receiver, wherein the second instruction causes the second receiver to retrieve, from each optimal transmitter of the second one or more optimal transmitters, the second respective one or more segments of the data assigned to the optimal transmitter, wherein the second receiver is different than the receiver.

11. The non-transitory computer-readable storage medium of claim 10, wherein one or more of: the step of selecting or the step of assigning, is performed based on current utilization of the plurality of transmitters.

12. The non-transitory computer-readable storage medium of claim 10, wherein one or more of: the step of selecting or the step of assigning, is performed based on resources available to the plurality of transmitters.

13. The non-transitory computer-readable storage medium of claim 10, wherein the steps further comprise: a particular optimal transmitter of the one or more optimal transmitters detecting that the receiver has failed and in response retrying sending the respective one or more segments of the data to the receiver until successful, until a particular number of retries has been attempted, or until a particular period of time has elapsed.

14. The non-transitory computer-readable storage medium of claim 10, wherein each optimal transmitter of the one or more optimal transmitters sends periodic status updates related to a progress of transferring the respective one or more segments of the data of the optimal transmitter to the receiver.

15. The non-transitory computer-readable storage medium of claim 10, wherein the receiver reconstructs the data from the respective one or more segments of the data retrieved from each optimal transmitter of the one or more optimal transmitters.

16. The non-transitory computer-readable storage medium of claim 10, wherein the steps further comprise, computing a plurality of sets of optimal transmitters, wherein the one or more optimal transmitters is a first set of optimal transmitters of the plurality of sets of optimal transmitters, wherein the instruction sent to the receiver identifies the plurality of sets of optimal transmitters.

17. The non-transitory computer-readable storage medium of claim 16, wherein the steps further comprise in response to detecting that a particular optimal transmitter of the one or more optimal transmitters has failed, retrieving the data from a second set of optimal transmitters of the plurality of sets of optimal transmitters.

18. The non-transitory computer-readable storage medium of claim 17, wherein the steps further comprise, in response to detecting that a particular optimal transmitter of the second set of optimal transmitters has failed, retrieving the data from a third set of optimal transmitters of the plurality of sets of optimal transmitters.

* * * * *

UNITED STATES PATENT AND TRADEMARK OFFICE
CERTIFICATE OF CORRECTION

| | |
|---|---|
| PATENT NO. | : 9,660,900 B2 |
| APPLICATION NO. | : 15/059074 |
| DATED | : May 23, 2017 |
| INVENTOR(S) | : Scott et al. |

It is certified that error appears in the above-identified patent and that said Letters Patent is hereby corrected as shown below:

In the Specification

In Column 5, Line 20, delete "that that" and insert -- that --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*